Patented Feb. 9, 1943

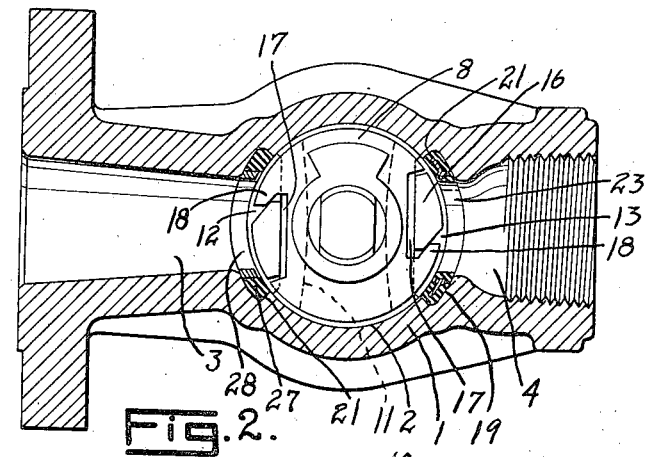
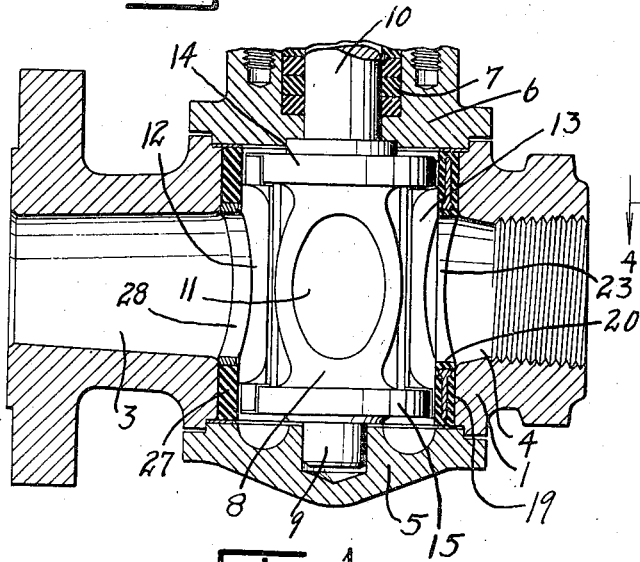
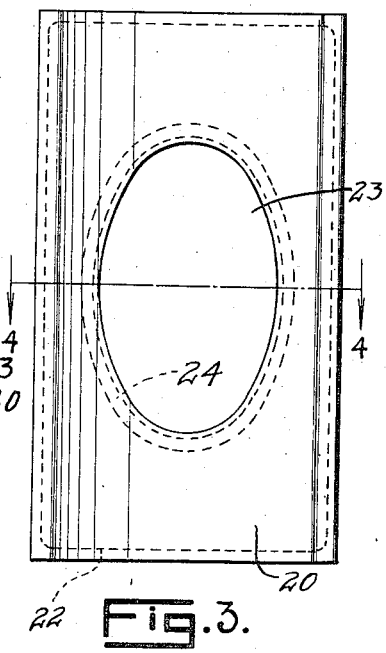
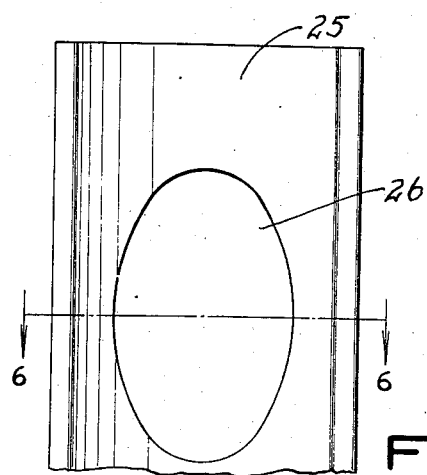
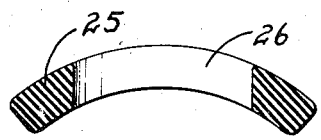

2,310,583

UNITED STATES PATENT OFFICE 2,310,583

VALVE

Charles F. Johnson, Houston, Tex., assignor to Reed Roller Bit Company, Houston, Tex., a corporation of Texas Application April 3, 1941, Serial No. 386,645

2 Claims. (Cl. 251—103)

This invention relates to valves of the modified plug type adaptable for use in lines for controlling the flow of gritty or abrasive fluids and also fluids which are hard to hold, such as butane, gasoline, kerosene, etc., under high pressure or velocities and more particularly has reference to seat constructions for such valves.

In modified plug valves of the type wherein separate closure members in the form of segments are mounted on a carrier on opposite sides of a passageway and are adapted to be brought into a position to close the flow ports of the valve body, it has been found desirable to cover or coat the closure members with rubber or other suitable seating material especially when fluids containing grit pass through the valves. The rubber or other seating material serves to provide a seal when the closure members are seated. It has been found however that the flow of fluid past the segments just before they close and just as they are beginning to open has under high pressure operation torn the seating material from the face of the segments, and it has been found impossible to so bond it to the segments that it cannot be torn loose by the flow of fluid.

The major object of this invention is to provide a valve construction in which the necessity of mounting a resilient seating material on the closure members will be eliminated.

Another object is to provide a valve construction in which a yieldable seating material is mounted in such a way that it will not be torn from its mounting by the flow of fluid through the valve.

Another object of this invention is to provide a valve having segments of seating material inserted in recesses in the valve body about the flow ports.

A further object of this invention is to provide a valve having segments of resilient seating material with their inner surfaces cylindrical to provide valve seats, said segments being held in place in a valve body independently of the valve closure member which moves relatively to and seats on said segments.

Still another object of this invention is to provide a valve construction having segments of seating material with their inner surfaces providing valve seats, said segments being held in place in a valve body independently of the valve closure member which moves relatively to and seats on said segments in which the segments are formed of a material rigid enough to hold its shape.

A still further object of this invention is to provide a valve having segments of resilient seating material with their inner surfaces providing valve seats, said segments being held in place in a valve body independently of the valve closure member which moves relatively to and seats on said segments and in which the segments are formed of soft, resilient material reinforced by a rigid core.

With these and other objects in view which will appear hereinafter, the invention resides in the parts and combinations shown in the accompanying drawing.

In the drawing:

Fig. 1 is a longitudinal cross sectional view through a valve embodying the present invention taken on a plane containing the axis of the valve actuating stem.

Fig. 2 is another longitudinal cross sectional view taken on a plane perpendicular to the axis of the valve actuating stem.

Fig. 3 is a side elevational view of a valve seating segment according to the present invention.

Fig. 4 is a sectional view taken on line 4—4 of Fig. 3.

Fig. 5 is a view similar to that of Fig. 3 showing a different form of seating segment.

Fig. 6 is a sectional view taken on line 6—6 of Fig. 5.

Referring to the drawing in which similar reference characters indicate similar parts, there is shown a valve body 1 which has a cylindrical bore 2 therein forming a valve chamber. Fluid flow openings or ports 3 and 4, either of which may serve as the inlet with the other serving as the outlet, are provided in the valve body and communicate with the cylindrical valve chamber 2. The lower end of the valve body as shown in Fig. 1 is provided with a closure 5 which has a recess formed centrally thereof which serves as a bearing for a valve carrier which will be referred to hereinafter. The upper portion of the valve body is provided with a closure 6 having a bore extending therethrough to receive the actuating stem of the valve carrier. Suitable packing 7 is provided between the valve actuating stem and the closure 6. The closures 5 and 6 are secured to the valve body in any preferred manner, suitable packing or gaskets being provided to prevent leakage, or either closure may be made integral with the body.

A valve carrier 8 provided with a bearing pin 9 and an actuating stem 10 is mounted co-axially in the chamber or bore 2. The pin 9 is mounted in the recess provided in the closure 5 as hereinbefore mentioned, and the stem 10 extends through the packing 7 in the stuffing box or gland provided in the upper closure or bonnet 6.

The valve carrier 8 has an opening 11 formed therein through which fluid passes when said opening is in register with the ports 3 and 4. On each side of the opening 11 there is mounted a pair of loosely carried closure segments 12 and 13. The outer surfaces of these segments correspond to the portion of a cylinder of substantially the same diameter as the diameter of the cylindrical bore 2. These segments 12 and 13 are positioned between upper and lower flanges 14 and 15 and have upper and lower lugs 16 which are received in suitable recesses or notches 17 formed in the upper and lower flanges 14 and 15. The lugs 16 and the recesses 17 are so shaped as to provide hook-shaped parts 18 cooperating with inclined surfaces on the lugs 16 of the closure segments so that when an opening movement of the valve carrier begins, the hook-shaped parts 18 will pull the valve segments away from their seats prior to moving them toward opening position.

According to the present invention, instead of having the closure segments 12 and 13 in metal to metal contact with the cylindrical surface of the bore 2, means are provided for mounting removable seats of rubber or other soft or resilient material in the bore 2 about the ports 3 and 4 for sealing contact with the closure segments 12 and 13. As is clearly shown in the drawing, the inner surface of the cylindrical bore 2 is removed about the ports 3 and 4 to provide recesses 19 in the form of segments of a cylindrical tube. These recesses in the form illustrated are of uniform depth or thickness and extend from the lower closure 5 to the upper closure 6 of the valve body, although this is not necessarily true of all forms of this invention.

As will appear from Figs. 2, 4 and 6 of the drawing, the recesses 19 and the segments 20 of seating material have their end edges lying in planes intersecting at the axis of the bore 2 and including said axis. Thus in the form of recesses and segments shown in Figs. 2, 4 and 6, the end edges of the recesses and the end edges 21 of the segments 20 lie in planes making an angle of approximately 75 to 90° with each other. With this construction, when a segment is slid axially into its seat, the end edges 21 of the segments engage the end edges of the recesses 19 and are in effect dovetailed in position so that they cannot be removed radially from their seats but only in an axial direction. This construction insures a tight-fitting and sealing seat which cannot be accidentally loosened or displaced within the valve body. In view of this rigid construction, it is possible to accurately construct the seating segments so that a tight, leak-proof joint is provided even when fluids containing grit or sediment or fluids which are difficult to confine flow through the valve under high pressure or high velocities. While the construction employed in the present invention insures a tight fit of the segments within the recesses provided therefor, said segments can be easily removed for replacement or other purposes.

One form of valve seat segment is shown in Figs. 3 and 4 which comprises a body formed of rubber or other suitable seating material. In this form of construction, the segment 20 has a reinforcing core 22 embedded therein. The core 22 is of substantially the same configuration as the segment 20 and is completely covered by the soft flexible coating. It has been found desirable to slightly modify the cross section of the core 22 adjacent the opening 23 and as shown in Fig. 4, it will be noted that a flange 24 is positioned within the opening in the reinforcing body 22.

A modified form of valve seat segment is shown in Figs. 5 and 6. According to this form of invention, the segment 25 is formed entirely of material which is itself strong or rigid enough to hold its shape without the use of a reinforcing core. The segment 25 is otherwise constructed identical to the segment 20 shown in Figs. 3 and 4 being provided with an opening 26 for registration with the ports 3 and 4 of the valve body. While the material of the valve seat segment 25 is hard enough to retain its shape, it is nevertheless soft enough to provide an effective seal between the bore 2 of the valve body and the closure segments 12 and 13. The material of the valve seat members is in all events of such a nature as to resist abrasion which is a well-known property of certain forms of rubber and various rubber substitutes.

The openings 23 and 26 in the valve seat segments are sufficiently large so that there will be no tendency for free edges of soft sealing material to be worn away by the liquid flowing therethrough under high pressure or high velocity.

Still another slight modification is illustrated in the segments shown in the left hand portions of Figs. 1 and 2. These segments designated by the numeral 27 are substantially the same as the segments illustrated in Figs. 5 and 6 with the exception, however, that the opening therethrough is somewhat larger than the port which the segments surround, and mounted in the opening through each of these valve seat members is a retaining ring 28 of a relatively hard rigid material. The presence of this retaining ring makes it possible for the segment to stand up under much higher pressures than it otherwise could, because the retaining ring prevents the pressure from blowing the material of the segments either out through the port or inward into the valve chamber.

In every case, the material of the segment must, of course, be strong enough to maintain its position under the action of the fluids controlled by the valve. Preferably for abrasive liquids it is of a relatively soft resilient material and it is preferable in all cases that it be soft enough or yieldable enough so that it will form a perfect seal. However, it is unnecessary that it be of rubber in all cases because in many instances it will be found that certain plastics will possess the necessary qualities of softness and toughness necessary to form these valve seating elements.

It is further noted that while the valve seat members are referred to herein as segments, the outer surfaces of these members may be of any configuration desired so long as they fit within the recesses provided therefor in the body of the valve and so long as the inner surfaces are shaped to provide a continuation of the inner contour of the valve chamber.

Having described my invention, I claim:

1. In a valve construction, a valve body having a cylindrical bore therein, providing a chamber, said body having flow ports therein communicating with the chamber, a plug rotatably mounted in and having substantially the same diameter as said bore and provided with a flow passage therethrough to register with the flow ports in open position of the valve, the inner surface of said bore being recessed about the periphery of said ports, said recesses being of uniform depth throughout, extending from one end to the other of said bore and being bounded by surfaces converging toward the chamber, whereby said recesses are in the form of segments of a cylindrical tube, and bodies of seating material, of substantially the same formation as the recesses mounted in said recesses and provided with openings to register with the ports and said segmental bodies of seating material being formed of soft resilient material having rigid reinforcing means therein comprising rigid members located in said openings and having a central aperture of the same size as and aligned with said ports and being of a length to fill the space between said plug and the bottom of said recesses when the plug is in valve closing position to completely confine said resilient material at said ports.

2. In a valve, a valve body having a bore therein and a port communicating with said bore, a plug in said bore having a passage therethrough and being rotatable to an open position in which the passage and port are in communication and to a closed position in which the passage and port are out of communication, the wall of said bore having a recess around said port, a rigid member in said recess surrounding said port and having an aperture therein of the same size as and registering with said port, the rigid member being in contact with said plug and the bottom of said recess when the plug is in closed position, and resilient sealing material filling said recess around said rigid member.

CHARLES F. JOHNSON.